No. 732,595. Patented June 30, 1903.

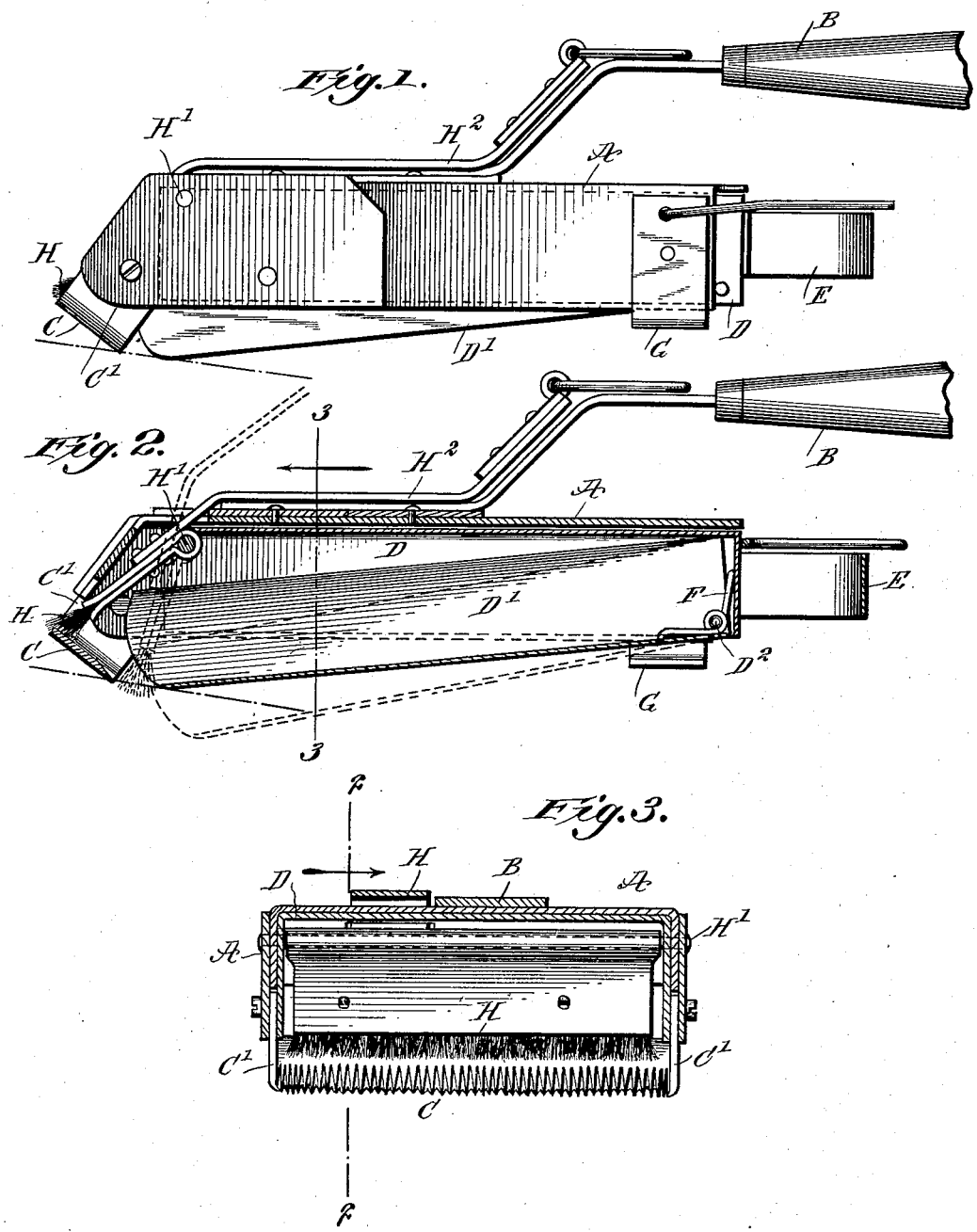

UNITED STATES PATENT OFFICE.

GEORGE ISAAC SILVERA, OF CRESCENT, ORA CABESSA, JAMAICA.

INSECT-CATCHER.

SPECIFICATION forming part of Letters Patent No. 732,595, dated June 30, 1903.

Application filed November 28, 1902. Serial No. 133,007. (No model.)

*To all whom it may concern:*

Be it known that I, GEORGE ISAAC SILVERA, a subject of the King of Great Britain, and a resident of Crescent, Ora Cabessa, Jamaica, have invented a new and Improved Insect-Catcher, of which the following is a full, clear, and exact description.

The object of the invention is to provide a new and improved insect-catcher more especially designed for the removal and capture of lice, ticks, and other pests from the skin of cattle, horses, and other animals, which is simple and durable in construction, easily manipulated, and arranged to readily dislodge the insects from the skin of the animal and gather the insects in a receptacle for final destruction in large quantities by any desired means.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is a longitudinal sectional elevation of the same on the line 2 2 of Fig. 3, and Fig. 3 is a transverse section of the same on the line 3 3 of Fig. 2.

A suitably-constructed support or casing A, open at the bottom and rear end, is provided on its top with a rearwardly-extending handle B, adapted to be taken hold of by the operator for manipulating the device, as hereinafter more fully described. On the forward end of the casing A is arranged a transversely-extending comb C, having its ends terminating in upturned flanges C', screwed, riveted, or otherwise secured to the sides of the casing A. The comb C stands at angles to the casing A and a distance from the bottom and forward end thereof, and the said comb is preferably provided with short teeth arranged along the lower edge of the comb-body and extended on the inside of the body a suitable distance, thereby forming triangular grooves between adjacent teeth, as will be readily understood by reference to Fig. 3. By this arrangement the minute insects, such as lice, are readily combed out of the skin of the animal upon drawing the comb over the skin in a downward direction— that is, in the direction in which the hair lies on the skin—the insects readily passing into the grooves and up the back of the comb, to accumulate thereon to the end of the stroke.

In the casing is arranged a drawer or like receptacle D, open at the front end and having at its rear end a handle E for conveniently sliding the receptacle in or out of position in the casing A. The bottom of the receptacle D is in the form of a scoop D', pivoted at its rear end at $D^2$ to the sides of the receptacle, a spring F serving to press the scoop downward for the free end thereof to move into proper position relative to the comb C to receive the gathered insects at the end of the stroke, at the time the comb and scoop are out of contact with the animal's skin treated at the time. It is understood that the free end of the scoop travels over the animal's skin during the combing process, and as the scoop is pivoted and spring-pressed it readily accommodates itself to any unevenness in the animal's skin. The downward swinging motion of the scoop D' is limited by a stop G, secured on the casing A.

In order to sweep the gathered insects adhering to the back of the comb into the scoop D', I provide a brush H, fulcrumed on a transverse rod H', secured in the sides of the casing, and the rear end of the brush-body terminates in a handle $H^2$, extending through an opening in the top of the casing A, alongside the shank of the handle B, to be within convenient reach of the operator. The brush H normally stands in close proximity to the back of the comb at the upper edge thereof, as plainly shown in the drawings, and when the stroke for gathering in the insects is completed the operator swings the handle $H^2$ upward, to cause the brush to move downward over the back of the comb and thereby sweep the gathered insects over the comb and down into the scoop D'. It is understood that the device is during the last-mentioned operation held with the comb end upward.

When the several parts are in the position illustrated in the drawings and the operator has hold of the handle B, he can then draw the device readily over the animal's skin with the teeth of the comb C combing the insects out of the hair, the free end of the scoop D' traveling in advance of the comb over the skin. During this operation the insects combed out of the hair accumulate on the back of the comb C and are held from sliding over the same by the bristles of the brush H, and when the operator has reached the end of the stroke he removes the device from engagement with the skin of the animal and holds it with the comb C upward, so that the scoop D' opens fully by the action of its spring F, as indicated by dotted lines in Fig. 2, and the insects held loosely on the back of the comb readily drop into the scoop and the remaining insects are swept over the back of the comb into the scoop by the operator imparting an outward swinging motion to the handle $H^2$ of the brush H. The comb C is thus cleansed of all insects by the action of the brush H, and the insects are swept into the scoop, in which they accumulate. Previous to the next stroke the operator swings the brush H back to its former position on the upper end of the back of the comb C, as indicated in the drawings.

The above operation is repeated until any desired quantity of insects have accumulated in the scoop D', and then the operator draws the receptacle D out of the support or casing A to allow of conveniently emptying the scoop for the destruction of the gathered-up insects by any well-known suitable means.

Having thus described my invention, I claim as new and desire to secure by Letters Patent—

1. An insect-catcher comprising a handled support, a transverse comb at the front end of the support and standing at an angle thereto, a receiving-receptacle in the support, for receiving the insects combed out of an animal's skin by the said comb, and a movable brush for sweeping the insects from the comb into the receptacle, as set forth.

2. An insect-catcher comprising a handled support, a transverse comb at the front end of the support and standing at an angle thereto, and a spring-pressed pivoted scoop opening with its free end onto the toothed end of the comb, as set forth.

3. An insect-catcher comprising a handled support, a transverse comb at the front end of the support and standing at an angle thereto, and a receiving-receptacle slidable in the support and provided with a spring-pressed pivoted scoop, opening with its free end onto the toothed end of the comb, as set forth.

4. An insect-catcher comprising a handled support, a transverse comb at the front end of the support and standing at an angle thereto, a spring-pressed pivoted scoop opening with its free end onto the toothed end of the comb, and a manually-controlled brush for sweeping the insects from the back of the comb into the said scoop, as set forth.

5. An insect-catcher provided with a comb having short teeth extending onto the back of the comb-body, to form grooves between adjacent teeth, as set forth.

6. An insect-catcher comprising a handled support, a transverse comb at the front end of the support and standing at an angle thereto, a receptacle slidably held in the said support and provided with a spring-pressed pivoted scoop, opening with its free end onto the toothed end of the comb, and a brush pivoted on the said support and adapted to engage the back of the comb, to sweep the insects from the comb into the said scoop, the said brush having a handle under the control of the operator, as set forth.

In testimony whereof I have signed my name to this specification in the presence of two subscribing witnesses.

GEORGE ISAAC SILVERA.

Witnesses:
 ROBERT BARROW SILVERA,
 JOHN RICHARD ABSALOM.